United States Patent
Dai et al.

(10) Patent No.: US 12,407,779 B2
(45) Date of Patent: *Sep. 2, 2025

(54) DISTRIBUTING QUERIES TO AGENT GROUP DEVICES

(71) Applicant: Zoom Communications, Inc., San Jose, CA (US)

(72) Inventors: Yongxiang Dai, Hefei (CN); Xu Hua Li, San Jose, CA (US); Fengkai Zhang, Hefei (CN)

(73) Assignee: Zoom Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/743,836

(22) Filed: Jun. 14, 2024

(65) Prior Publication Data
US 2024/0333838 A1     Oct. 3, 2024

Related U.S. Application Data

(63) Continuation of application No. 18/296,736, filed on Apr. 6, 2023, now Pat. No. 12,022,030, which is a (Continued)

(51) Int. Cl.
*H04M 3/00* (2024.01)
*H04M 3/51* (2006.01)
*H04M 3/523* (2006.01)

(52) U.S. Cl.
CPC ....... *H04M 3/5236* (2013.01); *H04M 3/5175* (2013.01); *H04M 3/5237* (2013.01)

(58) Field of Classification Search
CPC . H04M 3/5175; H04M 3/5537; H04M 3/5536
See application file for complete search history.

(56) References Cited

U.S. PATENT DOCUMENTS

| | | |
|---|---|---|
| 5,898,767 A | 4/1999 | Cave |
| 6,263,065 B1 | 7/2001 | Durinovic-Johri et al. |

(Continued)

FOREIGN PATENT DOCUMENTS

| | | |
|---|---|---|
| EP | 1021905 A1 | 7/2000 |
| EP | 2242245 A1 | 10/2010 |

OTHER PUBLICATIONS

Ringcentral, What is ACD? All you need to know about Automatic Call Distribution<https://www.ringcentral.com/contact-center/automatic-call-distribution.html>, Jul. 28, 2021, 3 pages.

(Continued)

*Primary Examiner* — Rasha S Al Aubaidi
(74) *Attorney, Agent, or Firm* — Young Basile Hanlon & MacFarlane, P.C.

(57) ABSTRACT

The distribution of incoming queries to a customer interaction center agent group is parallel processed amongst agents of that group to improve queue wait times. A threshold number of queries that may be processed by agent devices associated with the agent group at a given time are defined based on a number of agents of the agent group that are available at the given time. In response to determining that the number of queries is satisfies the threshold number of queries based on the number of agents that are available at a current time, a number of queries awaiting processing are distributed to one or more agent devices of the agent group. The threshold number of queries may be based on half of the number of agents that are available at the given time.

20 Claims, 11 Drawing Sheets

Related U.S. Application Data continuation of application No. 17/390,617, filed on Jul. 30, 2021, now Pat. No. 11,637,931.

(56) References Cited

U.S. PATENT DOCUMENTS

| | | |
|---|---|---|
| 7,027,584 B2 | 4/2006 | Boehm |
| 8,774,392 B2 | 7/2014 | Odinak et al. |
| 9,451,089 B2 | 9/2016 | Wang et al. |
| 10,616,415 B1 | 4/2020 | Howard |
| 11,176,461 B1 | 11/2021 | Merritt |
| 11,445,067 B1 | 9/2022 | Dai et al. |
| 11,637,931 B2 | 4/2023 | Dai et al. |
| 2004/0218749 A1 | 11/2004 | Shaffer et al. |
| 2004/0240659 A1 | 12/2004 | Gagle et al. |
| 2014/0169549 A1 | 6/2014 | Desai et al. |
| 2020/0288018 A1 | 9/2020 | Balasaygun et al. |
| 2020/0394584 A1 | 12/2020 | Walsh et al. |

OTHER PUBLICATIONS

International Search Report and Written Opinion mailed on Oct. 27, 2022 in corresponding PCT Application No. PCT/US2022/038305.
International Search Report and Written Opinion mailed on Nov. 11, 2022 in corresponding PCT Application No. PCT/US2022/038306.

US 12,407,779 B2

DISTRIBUTING QUERIES TO AGENT GROUP DEVICES

CROSS-REFERENCE TO RELATED APPLICATION(S)

This application is a continuation of U.S. application Ser. No. 18/296,736, filed Apr. 6, 2023, which is a continuation of U.S. application Ser. No. 17/390,617, filed Jul. 30, 2021, the entire disclosures of which are herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for incoming query distribution using parallel processing.

One aspect of this disclosure is a method, which includes defining a threshold number of queries that may be processed by agent devices associated with an agent group at a given time based on a number of agents of the agent group that are available at the given time, and distributing a number of queries awaiting processing to one or more agent devices of the agent group responsive to determining that the number of queries satisfies the threshold number of queries based on the number of agents that are available at a current time.

Another aspect of this disclosure is an apparatus, which includes a memory and a processor configured to execute instructions stored in the memory to determine a number of agents of an agent group that are available at a current time, select a number of queries awaiting processing from a queue based on a threshold number of queries and the number of agents of the agent group that are available at the current time, and distribute the number of queries to one or more agent devices of the agent group.

Yet another aspect of this disclosure is a non-transitory computer readable medium storing instructions operable to cause one or more processors to perform operations, which include distributing a number of queries selected from within a queue based on a number of agents of an agent group that are available at a current time to one or more agent devices of the agent group.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
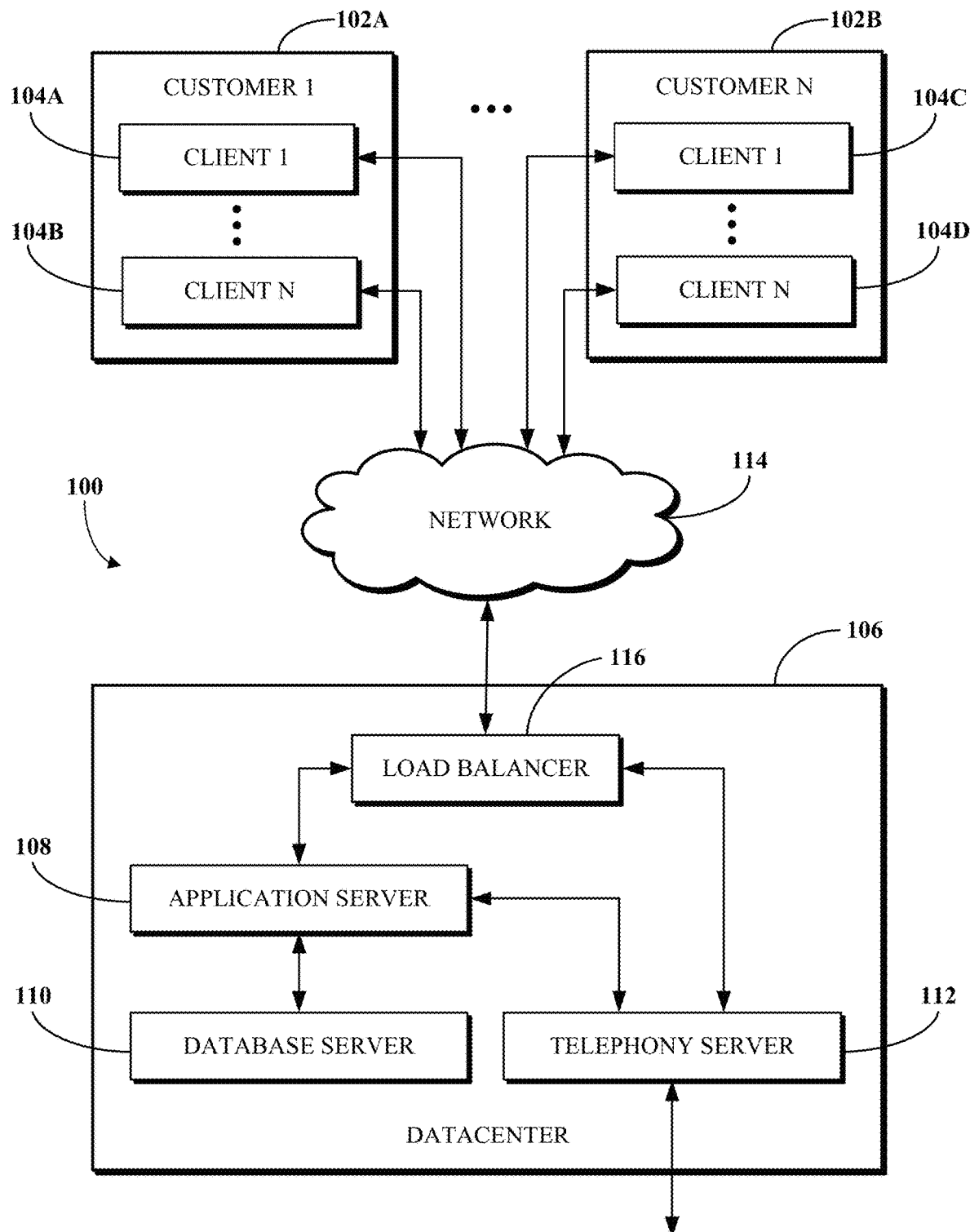
FIG. 1 is a block diagram of an example of an electronic computing and communications system.

The various communication services enabled by a UCaaS platform may be complex. In some cases, a user of the UCaaS platform may have questions, troubleshooting concerns, or other requests or issues regarding their use of those communication services. One way a provider of a UCaaS platform can address such incoming queries is using a customer interaction center, such as a call center or contact center, which includes agent groups assigned to different platform topics in which agents are trained to address queries related to their assigned topics. The most common modality of incoming communication historically has been over telephony and so in many cases these incoming queries are phone calls. In a typical case, a caller dials a customer service telephone number to reach a customer interaction center and then inputs information, such as through an interactive voice response menu or otherwise, to allow the system to route the call to the appropriate agent group. Once the call is routed to the appropriate agent group, it is queued until an agent of that agent group becomes available, at which point the call is distributed from the queue to the agent. As such, after navigating a call menu, the caller must wait for an agent to become available before he or she can address their matter.

Depending on the needs of the agent group or other configurations set for the customer interaction center, a next call awaiting processing may be distributed to agents of an agent group using one of three conventional approaches, which are simultaneous ringing, sequential ringing, and rotating ringing. With simultaneous ringing, the next call awaiting processing is simultaneously routed to all agents of the agent group until the first to occur of one of those agents answering the call or the session timing out. With sequential ringing, a list of agents and eventually an overflow list if necessary are sequentially traversed until the first to occur of an available agent being identified or the session timing out. With rotating ringing, a single list of agents is sequentially traversed repeatedly until the first to occur of an available agent being identified or the session timing out. Queued calls are typically routed on a first-in-first-out basis, but, in some cases and depending on the distribution approach used, they may instead be routed and serviced in another order.

However, these conventional distribution approaches may be ineffective or may otherwise result in increased wait times for queued calls to be distributed to agents and serviced. In particular, where an agent group is understaffed, or where there are a number of remote agents who are not actively logged in to service queued calls but who are still being counted as agents in the distribution pattern, the call distribution logic may delay the distribution of queued calls such as because fewer agents are available at a given time and sessions are more likely to time out. If the call distribution logic attempts to connect a queued call to an agent who is not actually available, the customer may have to wait some extended period of time (e.g., fifteen seconds) before being returned to the queue for another distribution attempt. For example, using sequential or rotating ringing, where a first agent in an agent group list is already handling a call and the second and third agents in the list are not actively logged in but still represented in the system as available for distribution in the system, the system will try the second and third agents before ultimately attempting to distribute the call to a fourth agent. This extended wait period may result in calls being handled out of a first-in-first-out order, such as by other calls being distributed to a newly available agent while the subject call is stuck in the wait period to be returned to the agent pool for distribution.

Furthermore, agents typically are given the option to provision the specific telephone number at which they would like to be reached by the system. An agent may use a telephone number made available by a private branch exchange (PBX) deployed for use by the customer interaction center (e.g., where the customer interaction center is provided by an entity which implements the UCaaS platform or is a customer thereof), or he or she could use a remote number external to the PBX. Where an agent uses a remote number, the system must connect with an outbound public switched telephone network (PSTN) which then routes the attempted call contact to the remote number. Because the call must leave the PBX domain to connect with the remote number, this process typically takes a lot of time. While the system may have visibility into status of agent devices which are provisioned with telephone numbers within the PBX domain, it does not have such visibility where a remote number is used, and so the system is unable to determine when to skip certain agents in a distribution order. In some cases, a client application running on an agent device used by an agent with a remote number may be used to push a notification indicative of the attempted call distribution to the agent. However, where the client application is not in a foreground of or loaded in memory on the agent device, the system must first interface with the device operating system to cause the client application to open and/or begin running. This thus results in an extended wait for the caller.

Implementations of this disclosure address problems such as these by parallel processing distributions of incoming queries, such as calls or other communications, within a queue for an agent group and by using skip criteria to control the agent devices to which incoming queries are distributed within the agent group. Regarding the parallel processing, the distribution of incoming queries to a customer interaction center agent group is parallel processed amongst agents of that group to improve queue wait times. A threshold number of queries that may be processed by agent devices associated with the agent group at a given time are defined based on a number of agents of the agent group that are available at the given time. In response to determining that the number of queries is satisfies the threshold number of queries based on the number of agents that are available at a current time, a number of queries awaiting processing are distributed to one or more agent devices of the agent group. The threshold number of queries may be based on half of the number of agents that are available at the given time.

Regarding the skip criteria, the number of agents to which incoming queries to a customer interaction center agent group may be distributed is limited based on skip criteria. The skip criteria is defined based on information associated with agent devices, such as locked status of a device, in-memory status of a client application at the device, or whether a telephone number provisioned for use with the device is from an external public switched telephone network. Agents which fail to satisfy the skip criteria are excluded from distributions of queries to improve wait times for customer interaction center users. Thus, queries are distributed from a queue to agents which satisfy the skip criteria.

To describe some implementations in greater detail, reference is first made to examples of hardware and software structures used to implement a query distribution system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
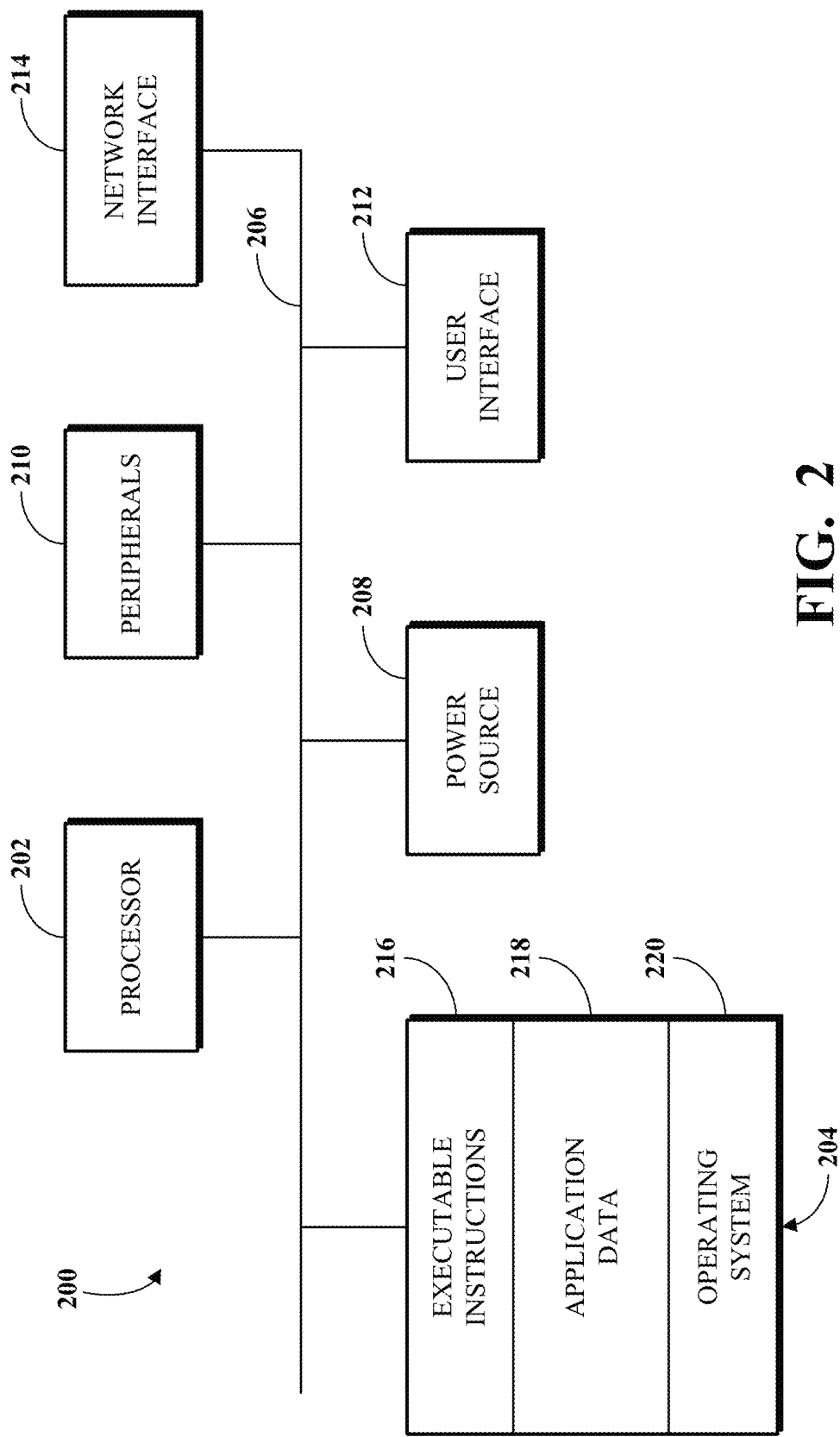
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
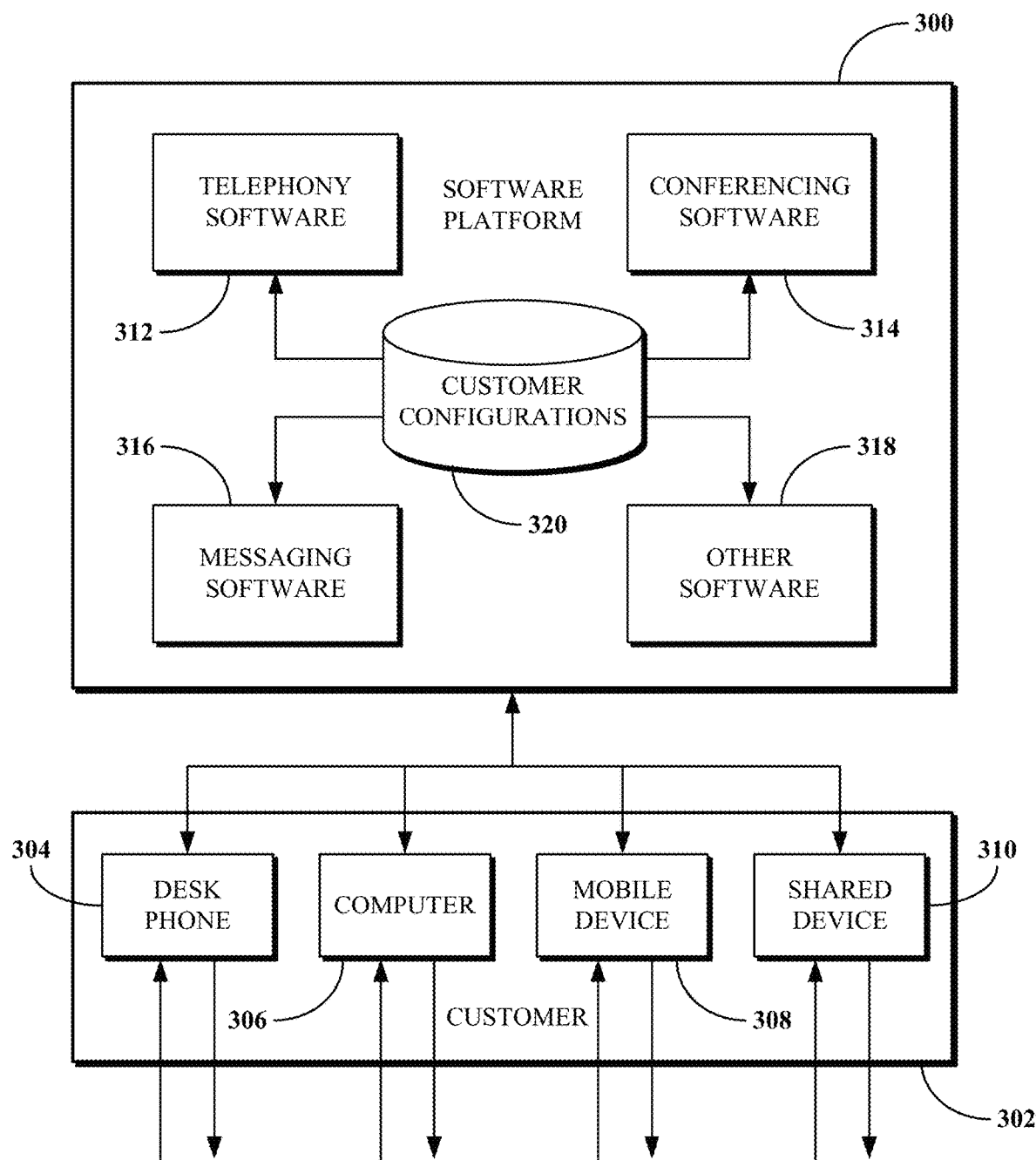
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310-a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include query distribution software for, for example, parallel processing queries for distribution within an agent group and for controlling the distribution of queries within an agent group based on skip criteria.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
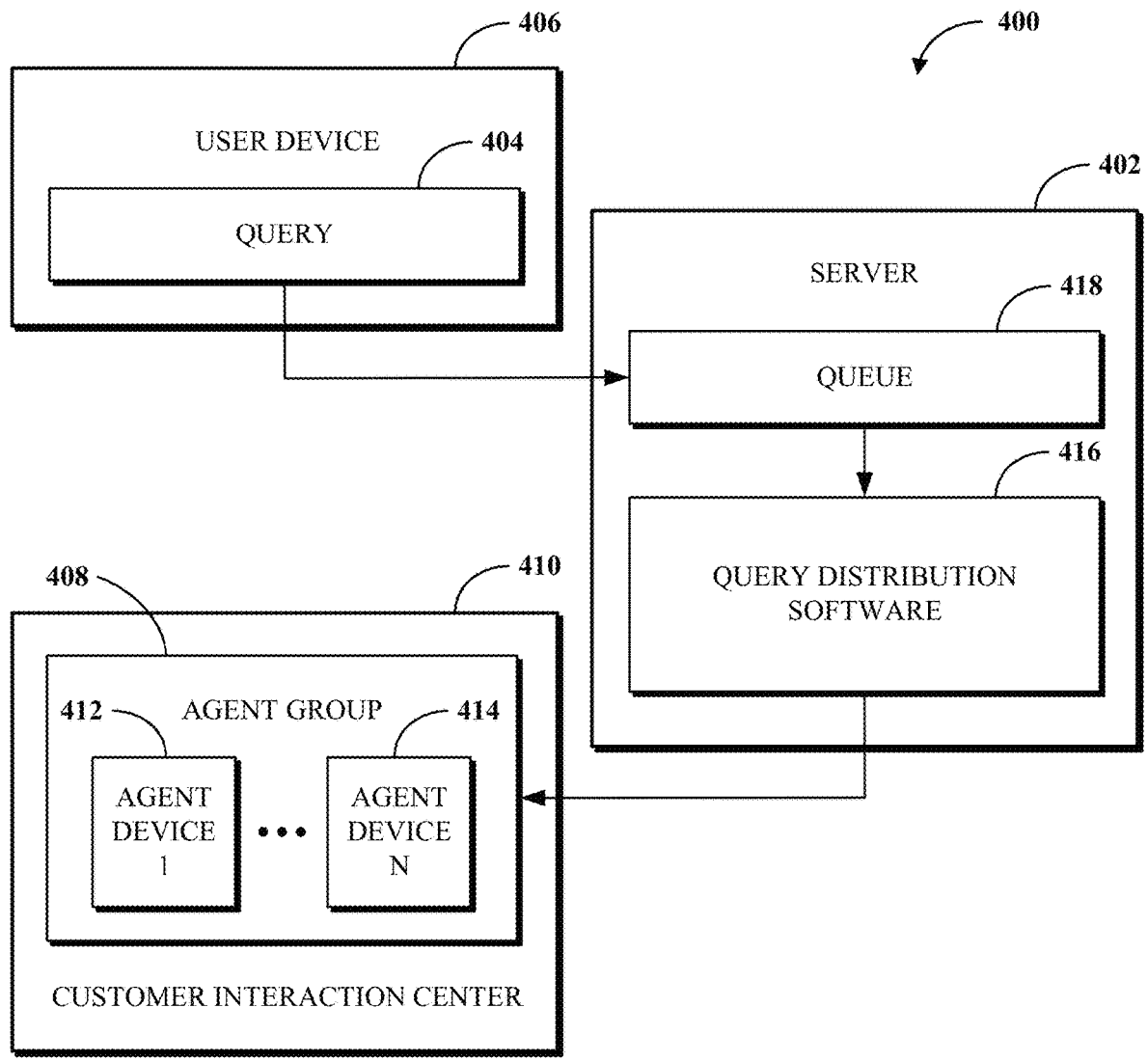
FIG. 4 is a block diagram of an example of a query distribution system.

FIG. 4 is a block diagram of a query distribution system 400, which includes a server 402 that receives a query 404 from a user device 406 and distributes the query 404 to an agent device of an agent group 408 of a customer interaction center 410. The agent group 408 includes a number of agent devices, such as an agent device 1 412 through an agent device N 414 in which the value of N is an integer greater than 1. Query distribution software 416 running at the server 402 is used to determine the distribution of queries within a queue 418 at the server 402 to ones of those agent devices in the agent group 408.

The query 404 is or otherwise represents a question, request, or other aspect intended for discussion with an agent of the customer interaction center 410. Some examples of what the query 404 may be placed for include a request to help setup a new piece of hardware, a question regarding the functionality of certain software, or a troubleshooting issue relating to a communication service. The query 404 is transmitted from the user device 406 to the server 402 over one of several different possible communication services, such as telephony, messaging, etc., such as that the communication between the user device 406 and the server 402 by which the query 404 is transmitted may be a telephone call, a chat message, a text message, or the like, a system which processes incoming queries on behalf of the recipient associated with the customer interaction center 410. The customer interaction center 410 may, for example, be a call center or a contact center.

The server 402, which may, for example, be the application server 108 or the telephony server 112 shown in FIG. 1, receives the query 404 and enqueues it into the queue 418 until it is time to distribute the query 404 to an agent device of the agent group 408. In some implementations, the server 402 may be located at the customer interaction center 410. For example, the server 402 may be an on-premises computing device rather than a cloud-based computing device.

The query distribution software 416 controls the distribution of the query 404 from the queue 418 based on availabilities of agents within the agent group 408. In particular, the query distribution software 416 is configured using parallel processing to distribute a number of queries including the query 404 to the devices of the agent group 408 based on a threshold number of queries which may be handled by the agent group 408 at a given time. The query distribution software 416 is further configured to distribute the number of queries including the query 404 to agents of the agent group 408 who satisfy skip criteria defined by or otherwise using the query distribution software.

The query 404 remains in the queue 418 until the query distribution software 416 distributes it to an agent device of the agent group 408. Once the query 404 is distributed to an agent device of the agent group 408, the agent using the subject agent device addresses the question, request, or other aspect represented by the query 404.

Figure 5:
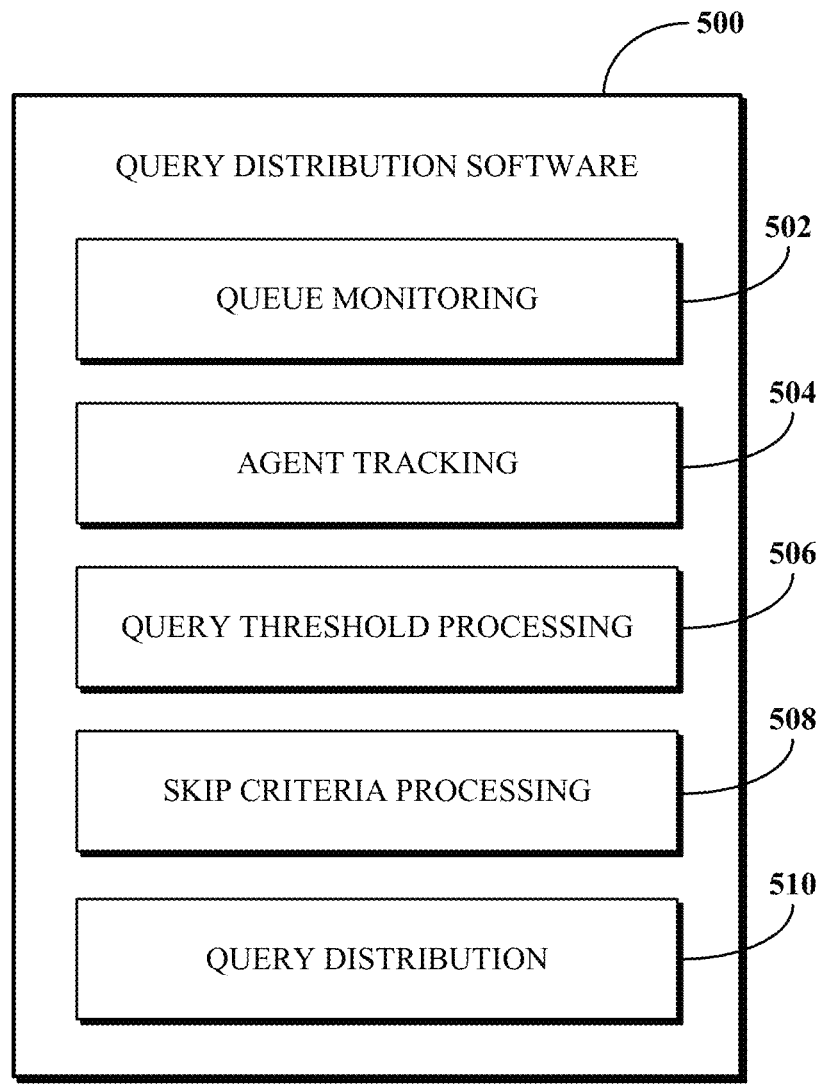
FIG. 5 is a block diagram of example functionality of query distribution software of a software platform.

FIG. 5 is a block diagram of example functionality of query distribution software 500 of a software platform, which may, for example, be the software platform 300 shown in FIG. 3. For example, the query distribution software 500 may be the query distribution software 416 shown in FIG. 4. The query distribution software 500 includes tools, such as programs, subprograms, functions, routines, subroutines, operations, and/or the like for processing and distributing queries received from clients of the software platform. As shown, the query distribution software 500 includes a queue monitoring tool 502, an agent tracking tool 504, a threshold processing tool 506, a skip criteria processing tool 508, and a query distribution tool 510.

The queue monitoring tool 502 monitors a queue at which queries awaiting distribution to an agent group at a customer interaction center are enqueued. Monitoring the queue can include determining at a given time a number of queries which are enqueued therein and/or determining which of those enqueued queries have been in the queue the longest (e.g., to determine that hte subset of the number of queries have been in the query queue longer than other queries of the number of queries).

The agent tracking tool 504 tracks in real-time or as close thereto as possible a number of agents of the agent group who are available to handle a query at a given time. The agent tracking tool 504 may communicate with a computing aspect at the customer interaction center that indicates when agents are not actively handling a query.

The threshold processing tool 506 performs processing related to a threshold number of queries which can be distributed to the agent group at a given time. The threshold number of queries is based on a number of agents of the agent group that are available at the given time. In particular, for parallel processing, the threshold number of queries is based on half of the number of agents that are available at the given time. The threshold processing tool 506 determines whether a total number of queries within the queue satisfies the threshold number of queries based on the number of agents that are available at a current time, as determined by the agent tracking tool 504. The threshold number of queries is subject to change at various times given its dependence on the number of available agents who may address queries at different speeds and which queries may be of varying degrees of difficulty to properly address. As such, the threshold processing tool 506 may in some cases update the threshold number of queries.

The skip criteria processing tool 508 performs processing related to skip criteria for limiting the distribution of queries within the agent group. The skip criteria is defined based on information associated with telephony devices used by agents of the agent group. For example, the information associated with the telephony devices and which are used to define the skip criteria may correspond to telephone numbers provisioned for use with the telephony devices and/or a client application configured to run at the telephony devices. The skip criteria processing tool 508 determines which agents of the agent group satisfy or fail to satisfy the skip criteria.

The query distribution tool 510 distributes a number of queries to agents of the agent group according to parallel processing and/or skip criteria. With parallel processing, the query distribution tool 510 selects the number of queries to distribute based on the determination, by the threshold processing tool 506, of whether the total number of queries in the queue satisfies the threshold number of queries. The query distribution tool 510 then distributes to agent devices associated with the agent group either that total number of queries as the number of queries or a number of queries which is less than that total number and which does satisfy the threshold number of queries. With skip criteria, the query distribution tool 510 distributes a number of queries to agents determined, by the skip criteria processing tool 508, to satisfy the skip criteria and as such does not distribute queries to agents determined to fail to satisfy the skip criteria.

The query distribution software 500 interacts with the agent devices of the agent group and/or a computing aspect of the customer interaction center at which the agent group is located, such as to determine available status of agents and agents who satisfy the skip criteria. In some cases, rather than directly distributing queries from the queue to the agents of the agent group, the query distribution software 500 may cause another computing aspect to distribute queries from the queue to the agent group.

Although the tools 502 through 510 are shown as functionality of the query distribution software 500 as a single piece of software, in some implementations, some or all of the tools 502 through 510 may exist outside of the query distribution software 500 and/or the software platform may exclude the query distribution software 500 while still including the tools 502 through 510 elsewhere.

Figure 6:
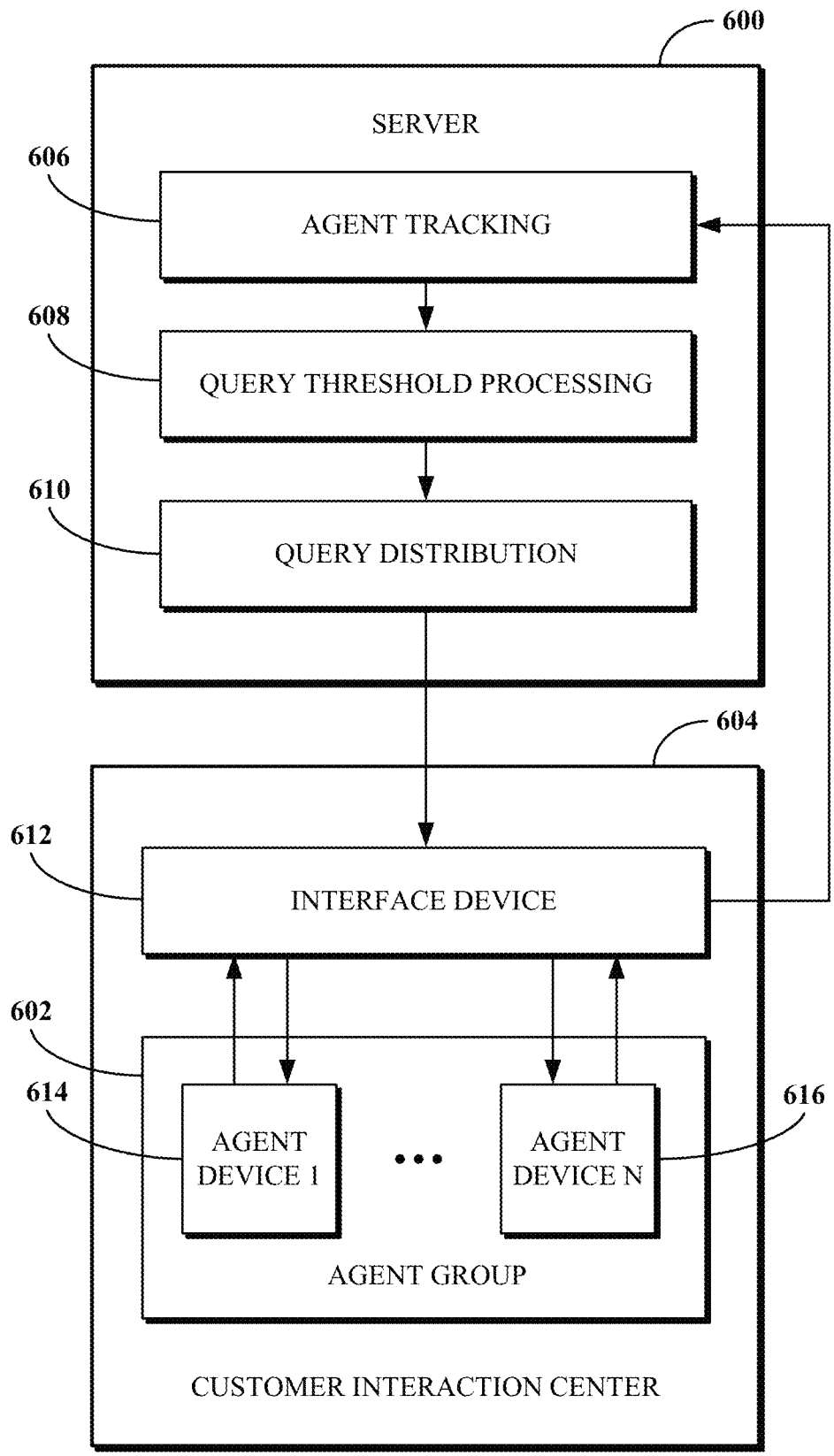
FIG. 6 is a block diagram of an example of a query distribution parallel processing system.

FIG. 6 is a block diagram of an example of a query distribution parallel processing system. Parallel processing is used for high volume call queue distribution in which the number of agents of an agent group who are available to handle queries at a given time is assumed to be less than (e.g., half of) what is reported and in which a queue of queries awaiting distribution is controlled by allowing only a number of queries (e.g., half of the total number of queries in the queue) to be distributed to the agents of the agent group at a given time. Accordingly, multiple queries may be distributed at one time rather than limiting processing to a single query at a time.

A server 600, which may, for example, be the server 402 shown in FIG. 4, includes software for tracking the available status of agents of an agent group 602 within a customer interaction center 604, for determining whether a total number of agents in a queue satisfies a threshold number of queries, and for distributing queries to those agents using parallel processing. The agent group 602 and the customer interaction center 604 may, for example, respectively be the agent group 408 and the customer interaction center 410 shown in FIG. 4. The software running at the server 600 includes an agent tracking tool 606, a query threshold processing tool 608, and a query distribution tool 610, which may, for example, be the agent tracking tool 504, the query threshold processing tool 506, and the query distribution tool 510 shown in FIG. 5.

The customer interaction center 604 includes an interface device 612, which is a computing device configured to interface between the software running at the server 600 and the agent devices 1 614 through N 616 of the agent group 602, in which N is an integer greater than one. In particular, the interface device 612 receives indications of statuses of the agent devices 1 614 through N 616 at various times and transmits data indicative of those agent device statuses to the agent tracking tool 606. For example, the interface device 612 may receive the indications of the statuses in response to events, such as individual ones of the agent devices 1 614 through N 616 taking a query for handling such that they change from available to unavailable or ending a query such that they change from unavailable to available. In another example, the interface device 612 may receive the indications of the statuses periodically at some discrete time interval, such as once per second. The interface device 612 may be configured to pull the indications of the statuses from the agent devices 1 614 through N 616. For example, the interface device 612 may pull such data in response to a request from software running at the server 600. Alternatively, the agent devices 1 614 through N 616 may push the indications of their statuses to the interface device 612.

The query threshold processing tool 608 receives information from the agent tracking tool 606 indicating the number of agents of the agent group 602 which are available at a given time and determines a number of queries to distribute from a queue (e.g., the queue 418 shown in FIG. 4) to ones of the agent devices 1 614 through N 616. In particular, the query threshold processing tool 608 determines whether a total number of queries in a queue satisfies a threshold number of queries based on the number of agents which are available. The query distribution tool 610 selects the queries to distribute based on output from the query threshold processing tool 508 and transmits those queries to the interface device 612 for routing to ones of the agent devices 1 614 through N 616 according to a distribution technique. The distribution technique may, for example, be a serial distribution technique or a rotating distribution technique.

The query distribution tool 610 in particular limits the number of queries which is distributed to the agent devices 1 614 through N 616 to a subset of the number of queries based on the output from the query threshold processing tool 608. In some cases, the number of queries which the query distribution tool 610 limits for distribution is based on (e.g., equal to) half of the number of available agents of the agent group 602. Limiting the number of queries which are simultaneously distributed to the agent devices 1 614 through N 616 in this way enables the distribution technique to be used to distribute the number of queries to maintain a first-in-first-out order for those queries.

In some implementations, the interface device 612 may be omitted. For example, the software running at the server 600 may be configured to communicate directly with the agent devices 1 614 through N 616 at the customer interaction center 604 instead of going through an intermediary such as the interface device 612.

Figure 7:
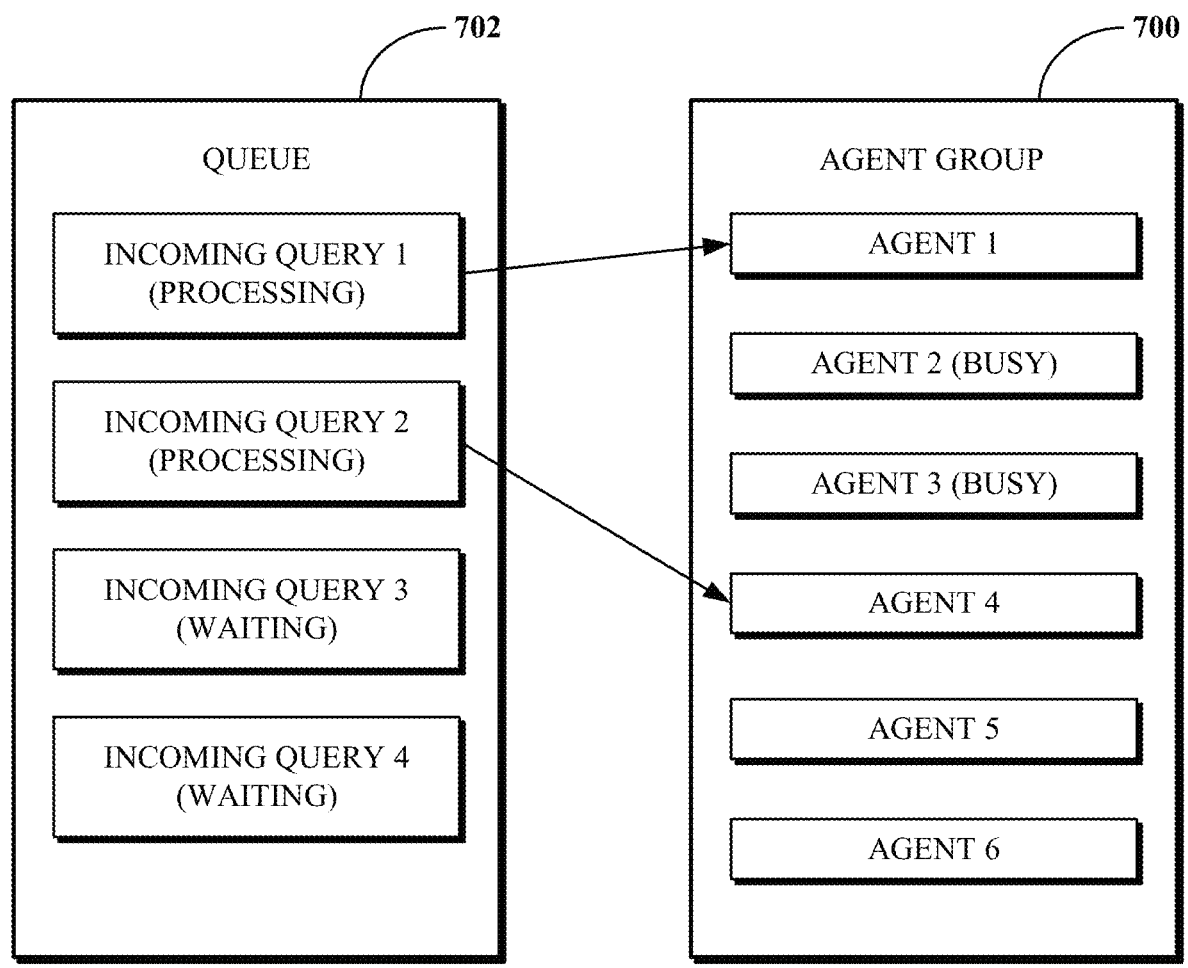
FIG. 7 is an illustration of an example of an agent group to which incoming queries are distributed using parallel processing.

FIG. 7 is an illustration of an example of an agent group 700 to which incoming queries are distributed from a queue 702 using parallel processing. As shown, the agent group 700 includes six agents of which two are identified as being busy. For example, the busy agents may be identified as busy based on an indication that those agents are handling a query or based on a determination that those agents are not actively logged in for query handling. The other agents are assumed to be available for query handling. Also as shown, the queue 702 includes four incoming queries, which may, for example, be telephone calls.

A threshold number of queries which can be distributed to the agents of the agent group 700 is determined based on the number of available agents of the agent group 700. For example, the threshold number of queries may be based on half of the number of agents that are available at the given time. In such a case, given that there are four agents of the agent group 700 who are available, two queries may be distributed at the same time from the queue 702. The two queries are then parallel processed by being simultaneously distributed from the queue 702 to the available agents of the agent group 700.

Based on the distribution technique used, distribution of the two queries may first be attempted to the first two available agents listed for the agent group 700, such as the agent 1 and the agent 4. Accordingly, as shown, the incoming query 1 is shown as marked in a processing status and attempted distribution thereof is made to the agent 1. Similarly, the incoming query 2 is shown as marked in a processing status and attempted distribution thereof is made to the agent 4. The agents 2 and 3 are skipped given their indicated busy status. The incoming queries 3 and 4 remain in the queue 702 and thus are shown as marked with a waiting status.

Assuming the agents 1 and 4 handle the incoming queries 1 and 2, no further distribution attempts of those queries 1 and 2 will be attempted to other agents; however, in the event the queries 1 and/or 2 are not handled by the agents 1 and/or 4, the distribution technique used will attempt the distribution to a further agent or agents. For example, where the agent 1 accepts the query 1 but the agent 4 does not accept the query 4 such as because the agent 4 is not available to handle it despite his or her status being reported as available, the distribution technique may next attempt to distribute the query 4 to the agent 5.

Additionally, assuming the agents 1 and 4 handle the incoming queries 1 and 2 and that the agents 2 and 3 remain busy, a next distribution iteration according to the same threshold number of queries would include distributing the incoming query 3, which is the next query awaiting processing in the queue 702, and attempt distribution thereto to agent 5, which is the next available agent in the agent group 700. That is because there would be two available agents, agents 5 and 6, so the parallel processing would be performed to distribute only a number of queries equal to half of that available agent number, or one query, from the queue 702.

Figure 8:
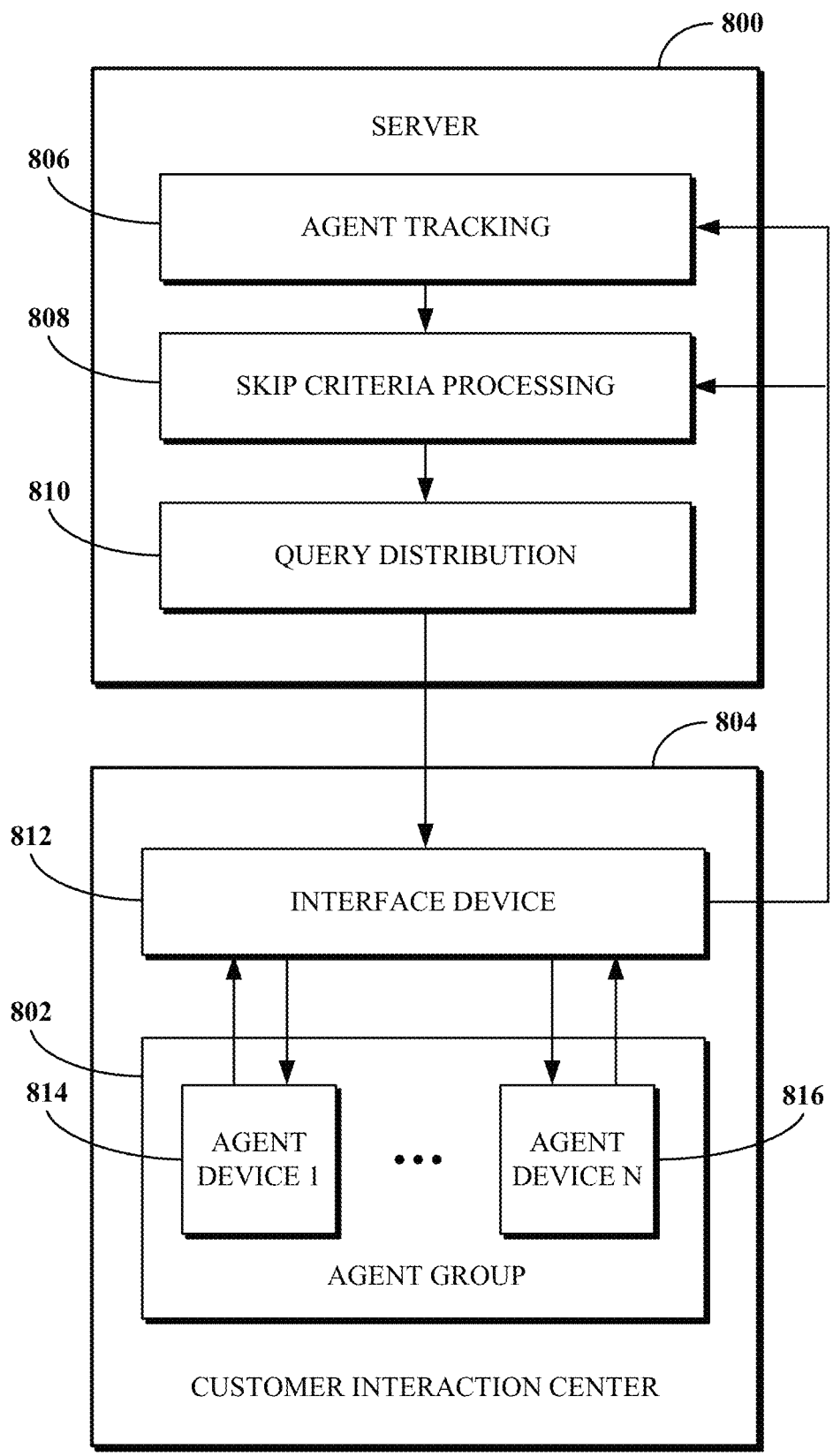
FIG. 8 is a block diagram of an example of a query distribution skip criteria system.

FIG. 8 is a block diagram of an example of a query distribution skip criteria system. Skip criteria are used to limit the distribution of queries to agents who may not be actively available to handle queries, notwithstanding their respective agent devices appearing to be available to the system. In particular, queries are not distributed to an agent device which fails to satisfy the skip criteria. Examples of agent device information which is evaluated to determine whether the skip criteria is satisfied includes information indicative of whether a client application is launched and in memory at an agent device, whether a screen of the agent device has a locked status, and whether a telephone number provisioned for use with the agent device is associated with an external PSTN. Skipping agent devices which fail to satisfy the skip criteria within the distribution of queries can shorten the waiting time for queued queries by not attempting to distribute queries to agents who are not actively available.

A server 800, which may, for example, be the server 402 shown in FIG. 4 or the server 600 shown in FIG. 6, to the extent different, includes software for tracking the available status of agents of an agent group 802 within a customer interaction center 804, for determining whether available agents satisfy skip criteria, and for distributing queries to those agents based on the skip criteria. The agent group 802 and the customer interaction center 804 may, for example, respectively be the agent group 408 and the customer interaction center 410 shown in FIG. 4 or the agent group 602 and the customer interaction center 604 shown in FIG. 6, to the extent different. The software running at the server 800 includes an agent tracking tool 806, a query threshold processing tool 808, and a query distribution tool 810, which may, for example, be the agent tracking tool 504, the query threshold processing tool 506, and the query distribution tool 510 shown in FIG. 5.

The customer interaction center 804 includes an interface device 812, which is a computing device configured to interface between the software running at the server 800 and the agent devices 1 814 through N 816 of the agent group 802, in which N is an integer greater than one. In particular, the interface device 812 receives indications of statuses of the agent devices 1 814 through N 816 at various times and transmits data indicative of those agent device statuses to the agent tracking tool 806. For example, the interface device 812 may receive the indications of the statuses in response to events, such as individual ones of the agent devices 1 814 through N 816 taking a query for handling such that they change from available to unavailable or ending a query such that they change from unavailable to available. In another example, the interface device 812 may receive the indications of the statuses periodically at some discrete time interval, such as once per second. The interface device 812 may be configured to pull the indications of the statuses from the agent devices 1 814 through N 816. For example, the interface device 812 may pull such data in response to a request from software running at the server 800. Alternatively, the agent devices 1 814 through N 816 may push the indications of their statuses to the interface device 812.

The interface device 812 also receives at various times information associated with the agent devices 1 814 through N 816 which may be used to determine whether those agent devices satisfy skip criteria. For example, the interface device 812 may receive the information associated with the agent devices 1 814 through N 816 in response to events, such as individual ones of the agent devices 1 814 through N 816 remaining in an unavailable or busy status for more than a threshold period of time (e.g., five minutes). In another example, the interface device 812 may receive the information associated with the agent devices 1 814 through N 816 periodically at some discrete time interval, such as once per second. The interface device 812 may be configured to pull the information associated with the agent devices 1 814 through N 816. For example, the interface device 812 may pull such data in response to a request from software running at the server 800. Alternatively, the agent devices 1 814 through N 816 may push the information associated therewith to the interface device 812.

The skip criteria processing tool 808 receives indications of the agent devices 1 814 through N 816 which are available from the agent tracking tool 806 and information associated with the agent devices 1 814 through N 816 from the interface device 812. The skip criteria processing tool 808 then determines which of the agent devices 1 814 through N 816 indicated as available satisfy the skip criteria. In some implementations, the skip processing tool 808 may determine which of the agent devices 1 814 through N 816 satisfy the skip criteria without using indications of the agent devices 1 814 through N 816 which are available. Thus, the available indications may be used to limit the expenditure of compute resources without affecting the ultimate result of the system. The query distribution tool 810 distributes a number of queries from a queue (e.g., the queue 418 shown in FIG. 4) to ones of the agent devices 1 814 through N 816 that satisfy the skip criteria, such as by routing those queries to ones of the agent devices 1 814 through N 816 according to a distribution technique. The distribution technique may, for example, be a serial distribution technique or a rotating distribution technique. The query distribution tool 810 thus limits the distribution of queries to the agent devices 1 814 through N 816 based on the output from the skip criteria processing tool 808.

In some implementations, the interface device 812 may be omitted. For example, the software running at the server 800 may be configured to communicate directly with the agent devices 1 814 through N 816 at the customer interaction center 804 instead of going through an intermediary such as the interface device 812.

Figure 9:
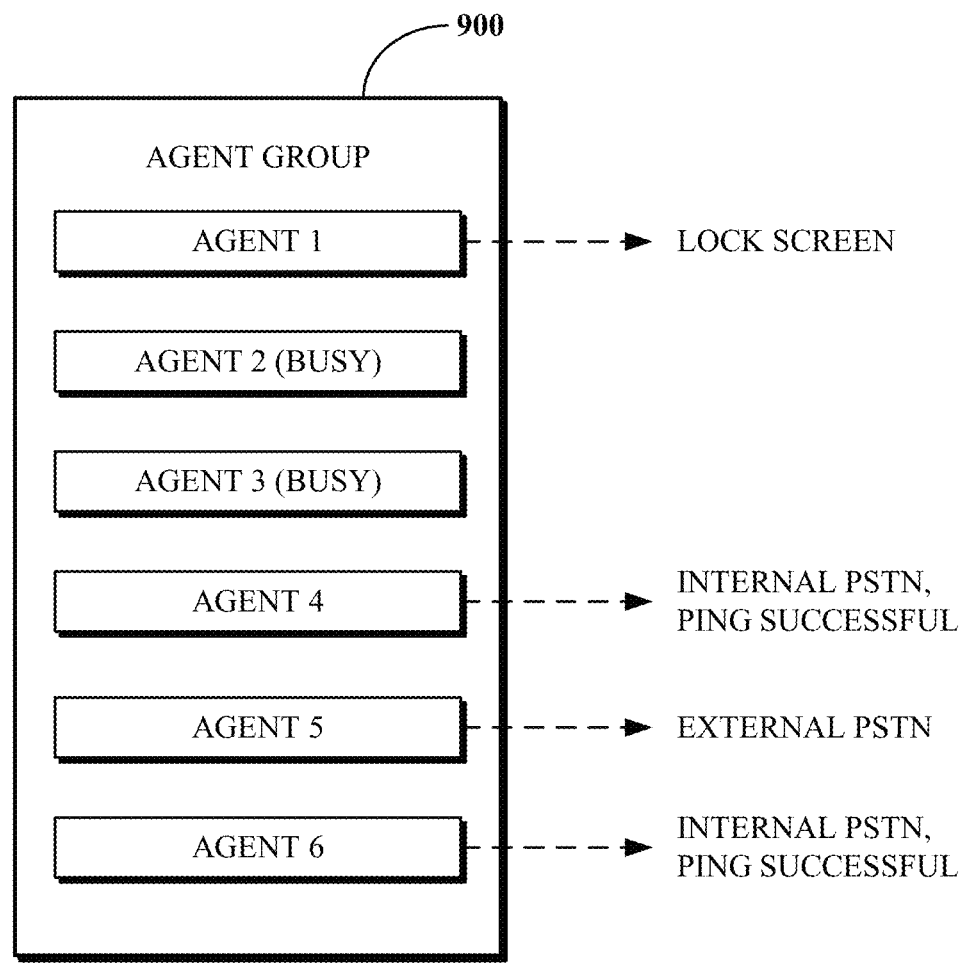
FIG. 9 is an illustration of an example of an agent group to which incoming queries are distributed subject to skip criteria.

FIG. 9 is an illustration of an example of an agent group 900 to which incoming queries are distributed subject to skip criteria. As shown, the agent group 900 includes six agents of which two are identified as being busy. For example, the busy agents may be identified as busy based on an indication that those agents are handling a query or based on a determination that those agents are not actively logged in for query handling. The other agents are assumed to be available for query handling. However, in some cases, those assumed available statuses may be inaccurate, such as where the agent devices corresponding to those agents do not have a client application loaded in memory, are on a lock screen, are provisioned with a telephone number from an external PSTN, or have another condition which imposes additional waiting time for a queued customer interaction center user while his or her query is distributed to those agents.

Information associated with the agent devices is obtained and used to determine whether those agent devices satisfy skip criteria. As shown, and in some implementations, information used to evaluate against skip criteria may only be obtained from agent devices which are represented as having an available status. However, in other cases, such information can be obtained from other or all agent devices in an agent group.

The information associated with the agent devices can be obtained in one or more ways, including by pinging the agent devices for a response, checking telephone number information, or the like. The same information or different information can be obtained from each of the relevant agent devices. As shown, the information obtained from the agent device for agent 1 indicates that the agent device is on a lock screen, the information obtained from the agent device for agent 4 indicates that the agent device uses a telephone number associated with a native PSTN (e.g., a PSTN implemented by a service provider which also implements or facilitates the operation of the customer interaction center) and that a ping was successfully responded to, the information obtained from the agent device for agent 5 indicates that a telephone number for an external PSTN is provisioned for use with that agent device, and the information obtained from the agent device for agent 6 indicates that the agent device uses a telephone number associated with a native PSTN and that a ping was successfully responded to.

Accordingly, the agent devices for the agents 4 and 6 will be considered to satisfy skip criteria. However, the agent devices for the agents 1 and 5 will be considered to fail to satisfy the skip criteria. When the time comes to select agent devices to which to distribute queries from a queue, the agent devices for the agents 1 and 5 (in addition to the agent devices for the agents 2 and 3, which are listed as having a busy status) will be skipped.

Figure 10:
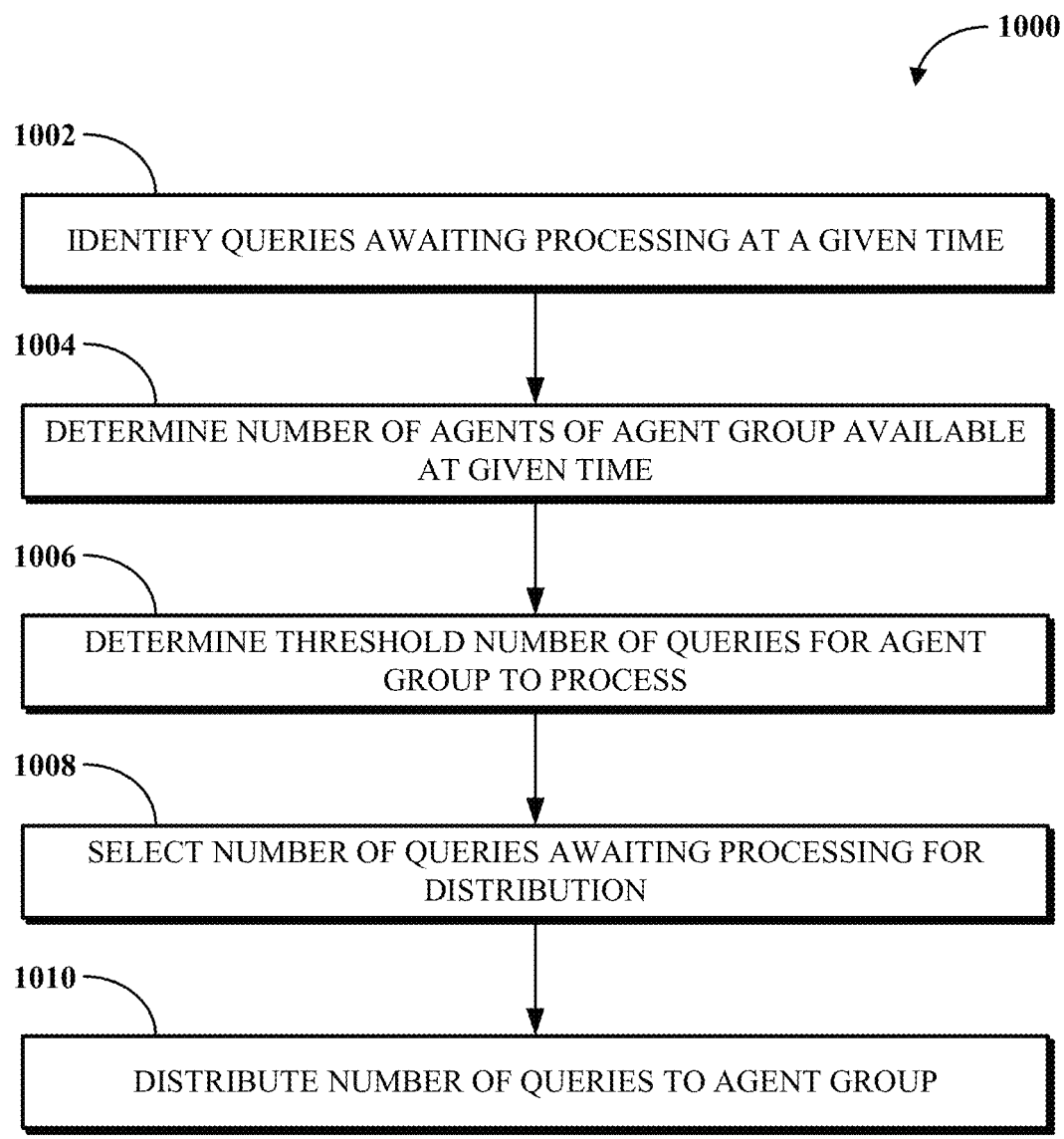
FIG. 10 is a flowchart of an example of a technique for parallel processing incoming queries for distribution within an agent group.
Figure 11:
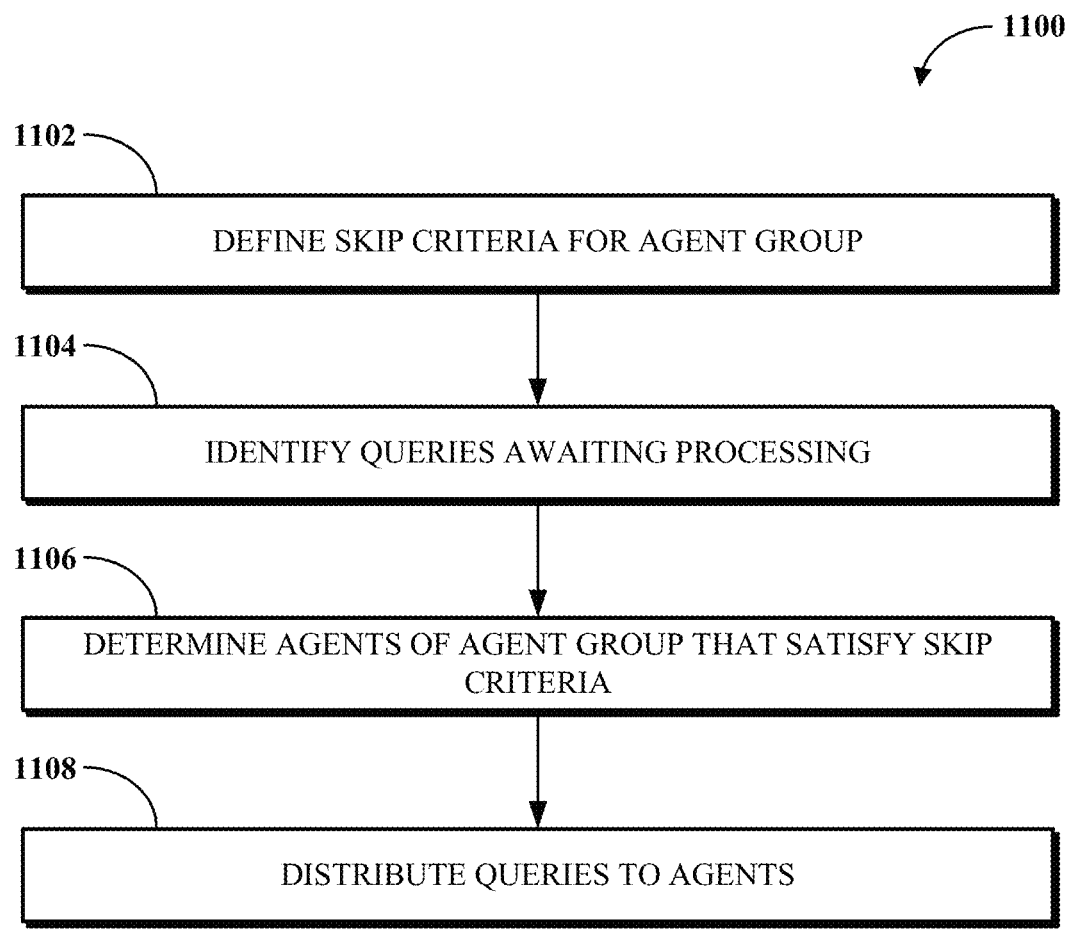
FIG. 11 is a flowchart of an example of a technique for controlling incoming query distribution within an agent group based on skip criteria.

To further describe some implementations in greater detail, reference is next made to examples of techniques which may be performed by or using a query distribution system. FIG. 10 is a flowchart of an example of a technique 1000 for parallel processing incoming queries for distribution within an agent group. FIG. 11 is a flowchart of an example of a technique 1100 for controlling incoming query distribution within an agent group based on skip criteria.

The technique 1000 and/or the technique 1100 can be executed using computing devices, such as the systems, hardware, and software described with respect to FIGS. 1-9. The technique 1000 and/or the technique 1100 can be performed, for example, by executing a machine-readable program or other computer-executable instructions, such as routines, instructions, programs, or other code. The steps, or operations, of the technique 1000 and/or the technique 1100 or another technique, method, process, or algorithm described in connection with the implementations disclosed herein can be implemented directly in hardware, firmware, software executed by hardware, circuitry, or a combination thereof.

For simplicity of explanation, the technique 1000 and the technique 1100 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, a flowchart of an example of the technique 1000 for parallel processing incoming queries for distribution within an agent group is shown. At 1002, incoming queries which are awaiting processing at a given time are identified. The incoming queries are in a queue awaiting processing, in particular, by distribution to an agent device of an agent group at a customer interaction center. Each of the incoming queries may correspond to a different user device. For example, where the incoming queries are telephone calls, each of the incoming queries is received from a different telephony device.

At 1004, a number of agents of the agent group which are available at a current time is determined. Determining the number of agents which are available includes pushing data to or pulling data from agent devices used by those agents to determine statuses of those agent devices. The status of an agent device may be reported as available where the agent associated therewith is actively logged in for handling queries and not currently handling a query at the given time or unavailable or busy where the agent is either not actively logged in or is actively handling a query distributed to the agent device. The number of agents available at the current time thus excludes one or more agents of the agent group that are processing a query at the current time.

At 1006, a threshold number of queries for the agent group to process is determined. Determining the threshold number of queries includes determining a definition of the threshold number of queries for the agent group. For example, the threshold number of queries may be defined as half of the number of available agents at a given time. In some cases, determining the threshold number of queries may include updating the definition of the threshold number of queries, such as based on a determination that a relatively low number of the agents of the agent group have been available within some period of time (e.g., twenty percent or less over the course of five minutes).

At 1008, a number of queries within the queue are selected for distribution based on the threshold number of queries and the number of agents that are available at the current time. Selecting the number of queries for distribution includes determining whether the total number of queries awaiting processing within the queue satisfies the threshold number of queries based on the number of available agents. For example, where the threshold number of queries is based on (e.g., equal to) half of the number of available agents, the total number of queries awaiting processing satisfies the threshold number of queries where it is equal to or less than half of the number of available agents. Where the total number of queries satisfies the threshold number of queries based on the number of available agents, all of the queries in the queue are selected for distribution. However, where the total number of queries awaiting processing does not satisfy the threshold number of queries based on the number of available agents, a number of queries which does satisfy that threshold number of queries based on the number of available agent is selected from the top of the queue.

At 1010, the number of queries are distributed to the agent group. Distributing the number of queries to the agent group includes simultaneously distributing each query of the number of queries to a different agent device of the agent group. The number of queries awaiting processing are distributed according to a distribution technique to maintain a first-in-first-out order for the incoming queries. For example, the distribution technique may be a serial distribution technique or a rotating distribution technique.

In some implementations, the agent devices to which the one or more queries are distributed may be limited based on skip criteria. For example, before distributing the one or more queries to the agent devices, one or more agents of the agent group that fail to satisfy the skip criteria may be determined and excluded from the distribution. In some such implementations, the determination of the agents that fail to satisfy the skip criteria may be made as part of the process for determining the agents that are available at the current time.

Referring next to FIG. 11, a flowchart of an example of the technique 1100 for controlling incoming query distribution within an agent group based on skip criteria is shown. At 1102, skip criteria is defined for use with an agent group. The skip criteria controls the distribution of queries to certain agents of an agent group based on those agents failing to satisfy the skip criteria. The skip criteria is defined based on information associated with telephony devices used by agents of the agent group. For example, the skip criteria may include a first criterion requiring that an agent device have a client application loaded in memory, a second criterion requiring that the agent device be in an unlocked state, and a third criterion requiring that the agent device use a provisioned telephone number with a native PSTN. In some implementations, the skip criteria may be defined based on a selection one or more criteria types such as by an agent group administrator.

At 1104, one or more queries awaiting processing are identified. The queries are enqueued in a queue while they await processing, such as by the distribution thereof to agents of the agent group. The queries may, for example, be telephone calls.

At 1106, agents of the agent group which satisfy the skip criteria and which fail to satisfy the skip criteria are determined. Determining which agents satisfy or fail to satisfy the skip criteria includes evaluating information associated with the agent devices used by those agents (e.g., telephony devices) against the skip criteria. For example, where the information associated with the agent devices corresponds to telephone numbers provisioned for use with the agent device, determining an agent that fails to satisfy the skip criteria includes determining that an agent of the agent group fails to satisfy the skip criteria responsive to determining that a telephone number provisioned for use with a telephony device associated with the agent is from an external public switched telephone network. In another example, where the information associated with the agent devices corresponds to a client application configured to run at the agent devices, determining an agent that fails to satisfy the skip criteria includes determining that an agent of the agent group fails to satisfy the skip criteria responsive to a request for the client application at a telephony device associated with the agent going unanswered within a time period. In yet another example, where the information associated with the agent devices corresponds to statuses of the agent devices, determining an agent that fails to satisfy the skip criteria includes determining that an agent of the agent group fails to satisfy the skip criteria responsive to determining that a status of a telephony device associated with the agent is locked.

At 1108, the one or more queries are distributed to the agents which satisfy the skip criteria. The agents who fail to satisfy the skip criteria are excluded from the distribution such that the one or more queries are distributed only to those agents who satisfy the skip criteria.

In some implementations, the one or more queries may be distributed using parallel processing such that the distribution of those one or more queries is based on a threshold number of queries and a number of available agents. For example, the number of agents who satisfy the skip criteria can be evaluated as part of the process for selecting a number of queries to simultaneously distribute from a queue. In some such implementations, the selection of the queries for distribution can be part of the process for distributing the one or more queries to the agents which satisfy the skip criteria.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media (e.g., as a non-transitory computer readable medium storing instructions operable to cause one or more processors to perform operations), and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    obtaining, using one or more processors, status information indicating a current number of agents of an agent group that are available for query handling;
    determining, using the one or more processors, to limit a distribution of a number of queries to a subset of the number of queries based on the current number of agents; and
    distributing, using the one or more processors, the subset of the number of queries to devices of agents of the current number of agents.

2. The method of claim 1, wherein determining to limit the distribution of the number of queries to the subset of the number of queries based on the current number of agents comprises:
    determining that the number of queries satisfies a threshold that is based on the current number.

3. The method of claim 1, wherein distributing the subset of the number of queries to the devices of the agents of the current number of agents comprises:
    simultaneously distributing the subset of the number of queries to ones of the devices.

4. The method of claim 1, comprising:
    monitoring a query queue associated with the agent group to determine that the subset of the number of queries have been in the query queue longer than other queries of the number of queries.

5. The method of claim 1, comprising:
    based on the status information, determining, for agents of the agent group, real-time availability for query handling.

6. The method of claim 1, wherein distributing the subset of the number of queries to the devices of the agents of the current number of agents comprises:
    skipping, from the distribution, one or more devices of the agent group according to skip criteria.

7. The method of claim 1, wherein the agent group includes agents of a contact center and queries of the number of queries are incoming communications to the contact center.

8. The method of claim 1, wherein each query of the number of queries is one of a telephone call, a video conference, a chat message, or a text message.

9. A non-transitory computer readable medium storing instructions operable to cause one or more processors to perform operations comprising:
    obtaining, using one or more processors, status information indicating a current number of agents of an agent group that are available for query handling;

determining, using the one or more processors, to limit a distribution of a number of queries to a subset of the number of queries based on the current number of agents; and distributing, using the one or more processors, the subset of the number of queries to devices of agents of the current number of agents.

10. The non-transitory computer readable medium of claim 9, wherein the subset of the number of queries satisfies a threshold that is based on half of a number of agents of the agent group that are available at a current time.

11. The non-transitory computer readable medium of claim 9, the operations comprising:

monitoring a query queue; and identifying the number of queries from within the query queue.

12. The non-transitory computer readable medium of claim 9, wherein one or more of the devices of the agent group that fail skip criteria are skipped from the distribution.

13. The non-transitory computer readable medium of claim 9, wherein the number of queries are received by a contact center and the agent group includes agents of the contact center.

14. An apparatus, comprising:

a memory; and a processor configured to execute instructions stored in the memory to:

obtain, using one or more processors, status information indicating a current number of agents of an agent group that are available for query handling;

determine, using the one or more processors, to limit a distribution of a number of queries to a subset of the number of queries based on the current number of agents; and distribute, using the one or more processors, the subset of the number of queries to devices of agents of the current number of agents.

15. The apparatus of claim 14, wherein the status information is used to the distribution of the subset of the number of queries to the devices.

16. The apparatus of claim 14, wherein the status information indicates that the current number of agents are available at a current time.

17. The apparatus of claim 14, wherein the devices exclude one or more of a first device that is actively processing a query, a second device in which a client application is other than loaded into memory, a third device having a locked status, or a fourth device provisioned with a telephone number associated with an external public switched telephone network.

18. The apparatus of claim 14, wherein the status information is obtained from an interface device in communication with the devices.

19. The apparatus of claim 14, wherein the subset of the number of queries is based on half of the current number of agents.

20. The apparatus of claim 14, wherein the agent group is of a contact center.

* * * * *